(12) United States Patent
Wang et al.

(10) Patent No.: US 9,008,816 B2
(45) Date of Patent: Apr. 14, 2015

(54) BUILD UP EDGE MONITORING METHOD

(75) Inventors: Shih-Ming Wang, Taoyuan County (TW); Chien-Da Ho, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 443 days.

(21) Appl. No.: 13/455,446

(22) Filed: Apr. 25, 2012

(65) Prior Publication Data
US 2013/0211570 A1 Aug. 15, 2013

(30) Foreign Application Priority Data

Feb. 10, 2012 (TW) .............................. 101104337 A

(51) Int. Cl.
*G06F 19/00* (2011.01)
*G05B 19/406* (2006.01)
(52) U.S. Cl.
CPC .................... *G05B 19/406* (2013.01)
(58) Field of Classification Search
USPC ................ 700/108; 33/556; 73/594
See application file for complete search history.

(56) References Cited

U.S. PATENT DOCUMENTS

| | | | |
|---|---|---|---|
| 5,212,645 A * | 5/1993 | Wildes et al. ................. | 700/108 |
| 2002/0129653 A1* | 9/2002 | Seth et al. ....................... | 73/594 |
| 2007/0262824 A1* | 11/2007 | Yamasaki ........................ | 331/74 |
| 2007/0283002 A1* | 12/2007 | Bornhoevd et al. ........... | 709/224 |
| 2009/0139509 A1* | 6/2009 | Kim et al. ....................... | 125/15 |
| 2010/0043244 A1* | 2/2010 | Anderson ....................... | 33/556 |
| 2012/0065937 A1* | 3/2012 | de Graff et al. ............... | 702/187 |

* cited by examiner

*Primary Examiner* — Michael D Masinick
*Assistant Examiner* — Anthony Whittington
(74) *Attorney, Agent, or Firm* — Rosenberg, Klein & Lee

(57) ABSTRACT

A build up edge monitoring method is provided for performing online real-time detection and suppression of abnormal build up edges of cutters occurred in a CNC manufacturing process. Signal variation analysis and fast Fourier transform are used for analyzing signals and establishing an algorithm of diagnosing build up edges to improve the efficiency and reliability of the cutting abnormality diagnostics. A vibration acceleration signal is captured and filtered to a frequency exceeding 1.1 times of a blade passing frequency, and an occurrence of accumulated chips is determined according to a sudden increase of the vibration acceleration and whether the main vibration frequency of the current vibration signal determined by a fast Fourier transform analysis matches with the frequency of the build up edge characteristic, and a shutdown instruction is issued to a CNC controller to shut down a cutting machine.

6 Claims, 6 Drawing Sheets

BUILD UP EDGE MONITORING METHOD

CROSS-REFERENCE TO RELATED APPLICATIONS

This non-provisional application claims priority under 35 U.S.C. §119(a) on Patent Application No(s). 101104337 filed in Taiwan, R.O.C. on Feb. 10, 2012, the entire contents of which are hereby incorporated by reference.

BACKGROUND OF THE INVENTION

1. Field of the Invention

The present invention relates to a monitoring method, in particular to a build up edge (BUE) monitoring method.

2. Description of the Related Art

In general, build up edge (BUE) generally occurs due to a too-high feeding speed of workpieces in a high-speed cutting process, a continuous production of chips produced by the workpieces made of a material with a higher cutting tensile strength, or a too-large friction between the chip and a cutter, so that the chip is melted and attached onto the top of the cutter, and the friction between the cutter edge and the surface of the workpieces is increased continuously, and the chips are accumulated at a cutter edge continuously, and the imbalance of cutting impedance becomes larger, so as to produce abnormal cutting vibrations, cause a drop of precision of the surface of the workpiece, wear out the cutter and damage the main shaft. If any of the aforementioned situations occurs, the cutting machine should be shut down and the cutter should be replaced to avoid damaging the workpieces and the machine.

Therefore, it is an important subject for related manufacturers to provide a build up edge monitoring method capable of controlling build up edges real time effectively, and preventing a drop of flatness and precision of a cut workpiece caused by the build up edge or even a scrap of products.

SUMMARY OF THE INVENTION

In view of the problems of the prior art, it is a primary objective of the present invention to provide a build up edge monitoring method capable of online real-time detection and suppression of an abnormal build up edge during a CNC manufacture, and avoiding the use of a complicated signal conversion analysis in the monitoring process, but using adopting a signal variation analysis and a fast Fourier transform for the signal analysis instead, so as to improve the efficiency and reliability of the cutting abnormality diagnosis based on a build up edge diagnostic algorithm.

To achieve the foregoing objective, the present invention provides a build up edge monitoring method, comprising the steps of: capturing a cutting vibration acceleration signal; filtering the cutting vibration acceleration signal with a frequency exceeding 1.1 times of a blade passing frequency, and the blade passing frequency being determined by a main shaft rotating speed S and a number of cutters N; comparing the cutting vibration acceleration signals of three consecutive predetermined time periods, and analyzing a maximum value and an average value of the cutting vibration acceleration signal of each predetermined time period, wherein the three consecutive predetermined time periods are a first predetermined time period, a second predetermined time period and a third predetermined time period; calculating a maximum value of the cutting vibration acceleration signal in the second predetermined time period and an average value of the cutting vibration acceleration signal in the first predetermined time period; comparing the maximum value of the cutting vibration acceleration signal in the second predetermined time period with the cutting vibration acceleration signal in the first predetermined time period to check whether a difference thereof is two times; performing a Fast Fourier Transform of the cutting vibration acceleration signal of the third predetermined time period to solve a main vibration frequency of the cutting vibration acceleration signal; solving a blade passing frequency of a build up edge, wherein the blade passing frequency of the build up edge is equal to the blade passing frequency $$\times \frac{(N-A)}{N},$$

wherein A is the number of built-up edged cutters, N is the number of cutters; and determining whether the main vibration frequency of the cutting vibration acceleration signal matches a blade passing frequency of the build up edge; shutting down the cutting machine, if the difference between the maximum values of the cutting vibration acceleration signal in the second predetermined time period and the cutting vibration acceleration signal in the first predetermined time period is two times, and the main vibration frequency matches the blade passing frequency of the build up edge.

Wherein, the blade passing frequency is determined by $$\text{Hz} = \frac{S}{60} \times N; \frac{S}{60}$$

is a main shaft rotating frequency, S is the main shaft rotating speed, and N is the number of cutters.

Wherein, each of the consecutive predetermined time periods is one second.

Wherein, the cutting vibration acceleration signal is captured by a vibration signal capturing module, and the vibration signal capturing module comprises a vibration accelerometer, a signal amplifier, a signal capturing box and a data acquisition card.

Wherein, the vibration signal capturing module compares a NC code to determine whether to capture a vibration signal generated by a factor other than cutting.

Wherein, the NC code is generated by a CNC controller and the CNC controller generates the NC code according to a status of a fast feed orientation of a cutter or a shutdown of the main shaft of the cutter.

The technical content of the present invention will become apparent with the detailed description of preferred embodiments and the illustration of related drawings as follows.

DETAILED DESCRIPTION OF THE PREFERRED EMBODIMENTS

The technical contents of the present invention will become apparent with the detailed description of preferred embodiments and the illustration of related drawings as follows.

Figure 1:
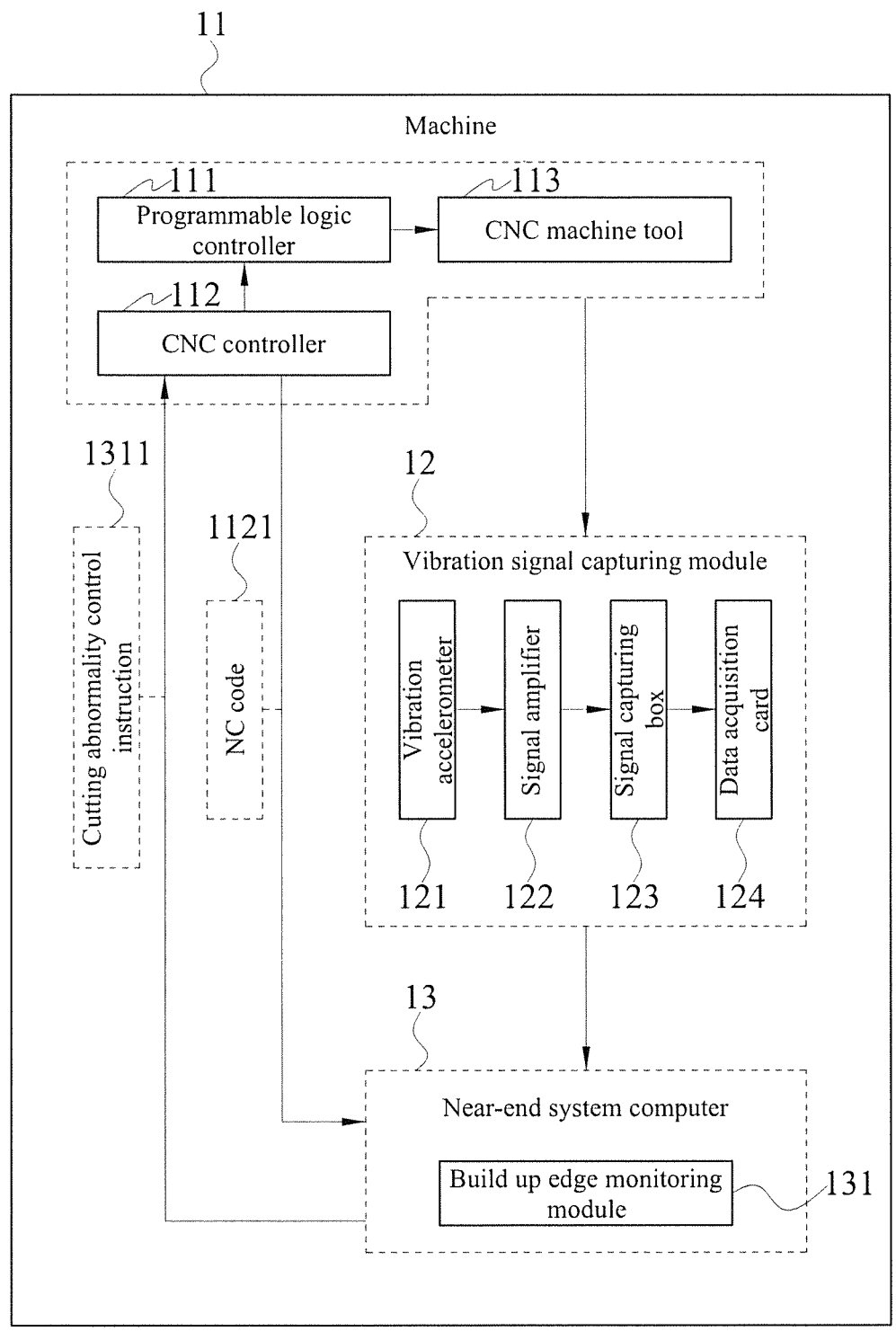
FIG. 1 is a system block diagram corresponding to a build up edge monitoring method in accordance a preferred embodiment of the present invention.

With reference to FIG. 1 for a system block diagram corresponding to a build up edge monitoring method in accordance a preferred embodiment of the present invention, a system using the build up edge monitoring method includes a machine 11, a vibration signal capturing module 12 and a near-end system computer 13.

The machine 11 comprises a programmable logic controller (PLC) 111, a computer numerical control (CNC) controller 112 and a CNC machine tool 113.

The vibration signal capturing module 12 comprises a vibration accelerometer 121, a signal amplifier 122, a signal capturing box 123 and a data acquisition card 124 (DAQ).

The near-end system computer 13 comprises a build up edge monitoring module 131.

When the machine starts the cutting, the system retrieves a cutting vibration signal through the vibration signal capturing module 12 for processing, and then transmits the cutting vibration signal to the near-end system computer 13 to perform a signal analysis, while transmitting the real-time information of the CNC controller 112 to the near-end system computer 13. Wherein, if the build up edge monitoring module 131 of the near-end system computer 13 diagnoses an abnormal situation, then the build up edge monitoring module 131 will transmit a cutting abnormality control instruction 1311 to the CNC controller 112.

If the CNC controller 112 receives the cutting abnormality control instruction 1311, then the programmable logic controller 111 will be turned on, so as to improve the cutting abnormality. In addition, the diagnostic information and control result are stored in a remote central monitoring platform (not shown in the figure) and provided for a process optimization assisted system to perform a parameter optimization analysis and propose suggestions for a parameter adjustment, so as to avoid recurrence of abnormality in future manufacturing.

Figure 2:
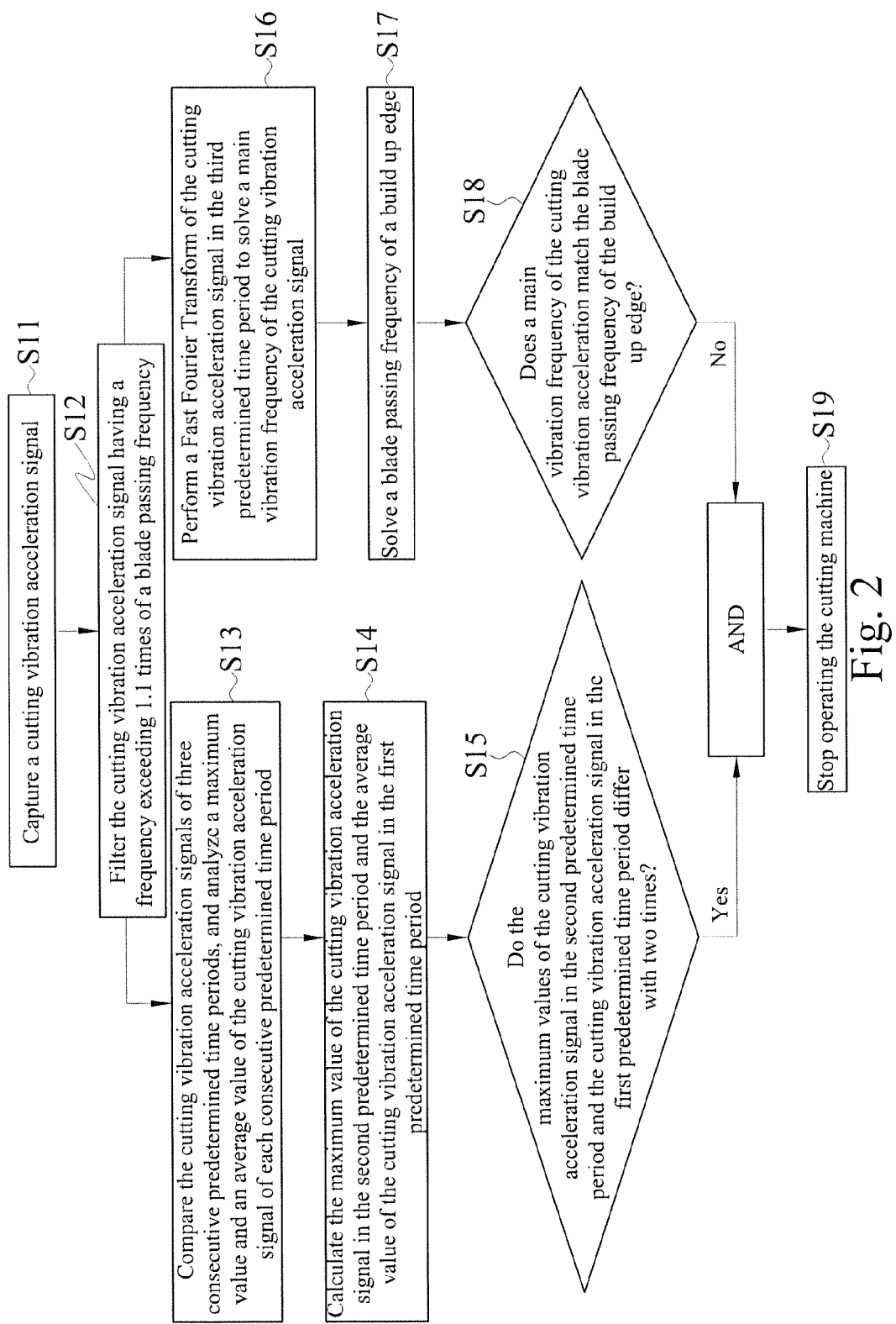
FIG. 2 is a flow chart of a build up edge monitoring method in accordance a preferred embodiment of the present invention.

With reference to FIG. 2 for a flow chart of a build up edge monitoring method in accordance with a preferred embodiment of the present invention, the build up edge monitoring method comprises the following steps:

S11: Capture a cutting vibration acceleration signal.

S12: Filter the cutting vibration acceleration signal having a frequency exceeding 1.1 times of a blade passing frequency, wherein the blade passing frequency is determined by a main shaft rotating speed S and a number of cutters N.

S13: Compare the cutting vibration acceleration signals of three consecutive predetermined time periods, and analyze a maximum value and an average value of the cutting vibration acceleration signal of each consecutive predetermined time period, wherein the three consecutive predetermined time periods are a first predetermined time period, a second predetermined time period and a third predetermined time period.

S14: Calculate the maximum value of the cutting vibration acceleration signal in the second predetermined time period and the average value of the cutting vibration acceleration signal in the first predetermined time period;

S15: Compare the maximum value of the cutting vibration acceleration signal in the second predetermined time period with the cutting vibration acceleration signal in the first predetermined time period to check whether their difference is two times.

S16: Perform a Fast Fourier Transform of the cutting vibration acceleration signal in the third predetermined time period to solve a main vibration frequency of the cutting vibration acceleration signal.

S17: Solve a blade passing frequency of a build up edge, wherein the blade passing frequency of the build up edge is equal to the blade passing frequency $$\times \frac{(N-A)}{N},$$

wherein A is the number of build-up edged cutters, and N is the number of cutters.

S18: Determine whether a main vibration frequency of the cutting vibration acceleration matches the blade passing frequency of the build up edge;

S19: Stop operating the cutting machine, if the difference between the maximum values of the cutting vibration acceleration signal in the second predetermined time period and the cutting vibration acceleration signal in the first predetermined time period is two times, and the main vibration frequency matches the blade passing frequency of the build up edge.

In the conventional method of determining a build up edge, a cutter with accumulated chips loses most of its cutting capability, and this characteristic is used for the diagnosis, and observe a vibration frequency that falls within a neighborhood of (N−A)/N times of a blade passing frequency if a build up edge occurs. Since the accumulated chip will cause a change of a normal rake angle γn that results in a change of the cutting capability. The vibration produced by these changes will be reflected on an acceleration signal, so that this key characteristic can be used for determining a build up edge more reliably and accurately.

If the build up edge occurs, a signal of a vibration accelerometer will be captured, wherein the performance of the vibration acceleration has the following two characteristics:

(a): The vibration frequency falls in the neighborhood of (N−A)/N of the blade passing frequency as shown in Equation (1-1).

Figure 3:
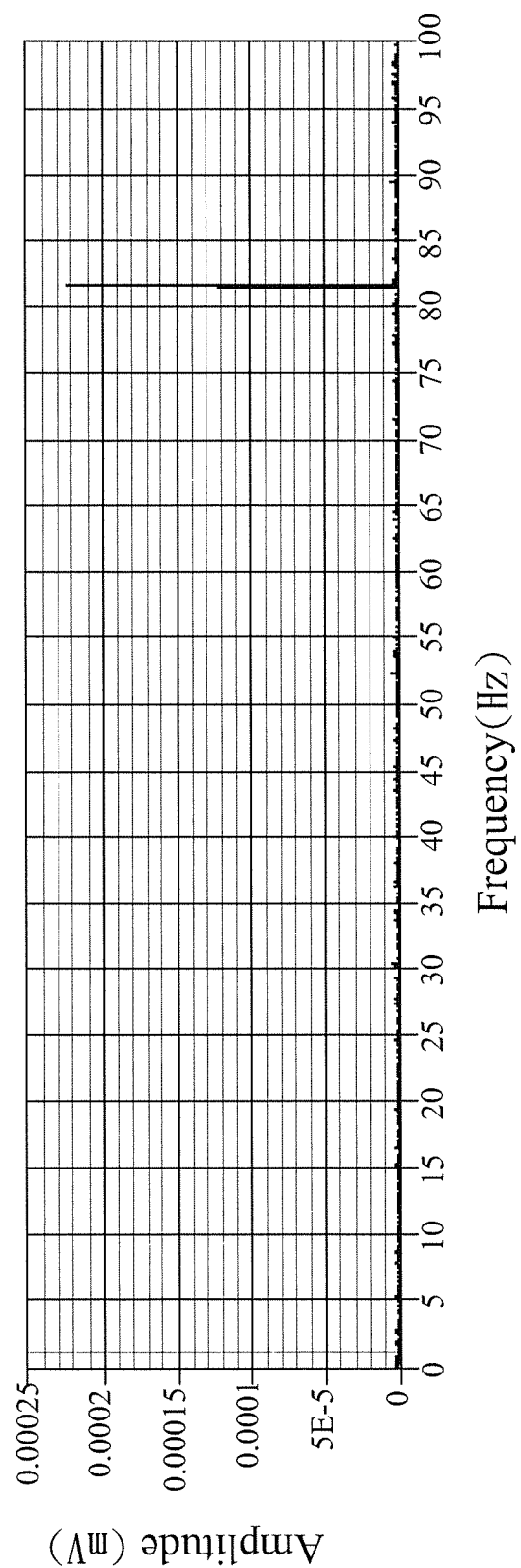
FIG. 3 shows a blade passing frequency of a normal cutting.
Figure 4:
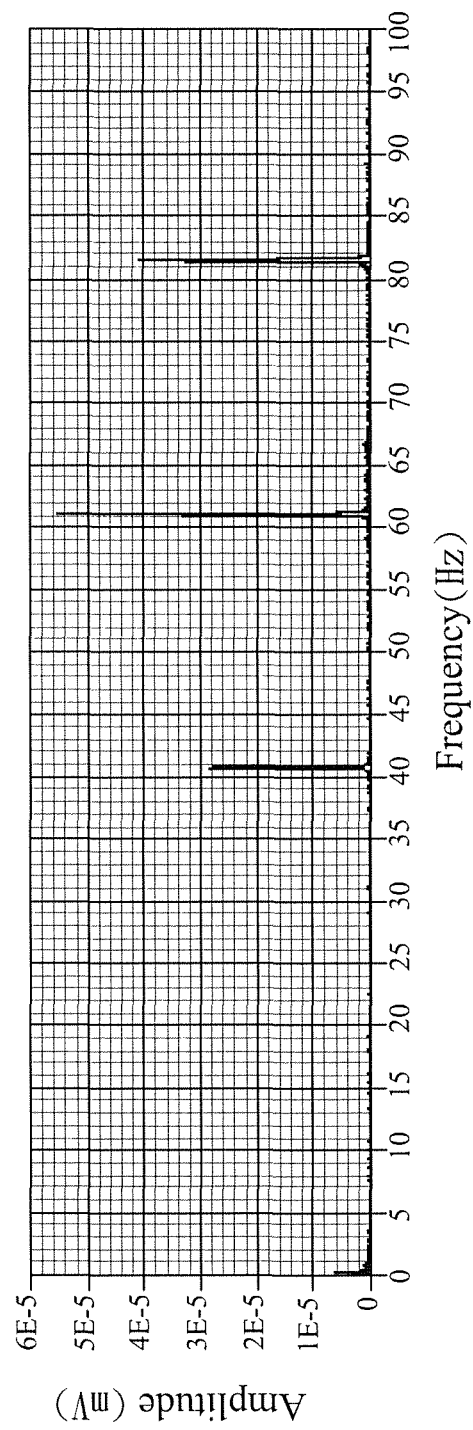
FIG. 4 shows a blade passing frequency of a build up edge.

When a build up edge occurs, chips are melted and attached on the top of the cutter to reduce the cutting capability of the cutter, and this phenomenon can be considered as a void of this cutter in a cutting system. In Equation (1-2), the blade passing frequency obtained from a build up edge has the relation as shown in Equation (1-1). With reference to FIGS. 3 and 4, this embodiment adopts a number of cutters is 4, and a main shaft rotating speed is 1200 rpm. When chips are produced, the vibration frequency varies with the number of build up edged cutters and may be equal to 3/4, 2/4 or 1/4 times of the blade passing frequency. FIG. 3 shows that the blade passing frequency of a normal cutting is equal to 80 Hz, and FIG. 4 shows that the blade passing frequencies of a build up edge are equal to 60 Hz and 40 Hz.

The blade passing frequency of the build up edge $$= \text{Blade passing frequency} \times \frac{(N-A)}{N} \qquad \text{Equation (1-1)}$$

$$= S/60 \times \frac{(N-A)}{N} \qquad \text{Equation (1-2)}$$

Wherein, S is the RPM of the main shaft, N is the number of cutters, and A is the number of build-up edged cutters, A=1, 2, 3 . . . , A<N (b): The build up edge occurred spontaneously may cause abnormal vibration acceleration.

Figure 5:
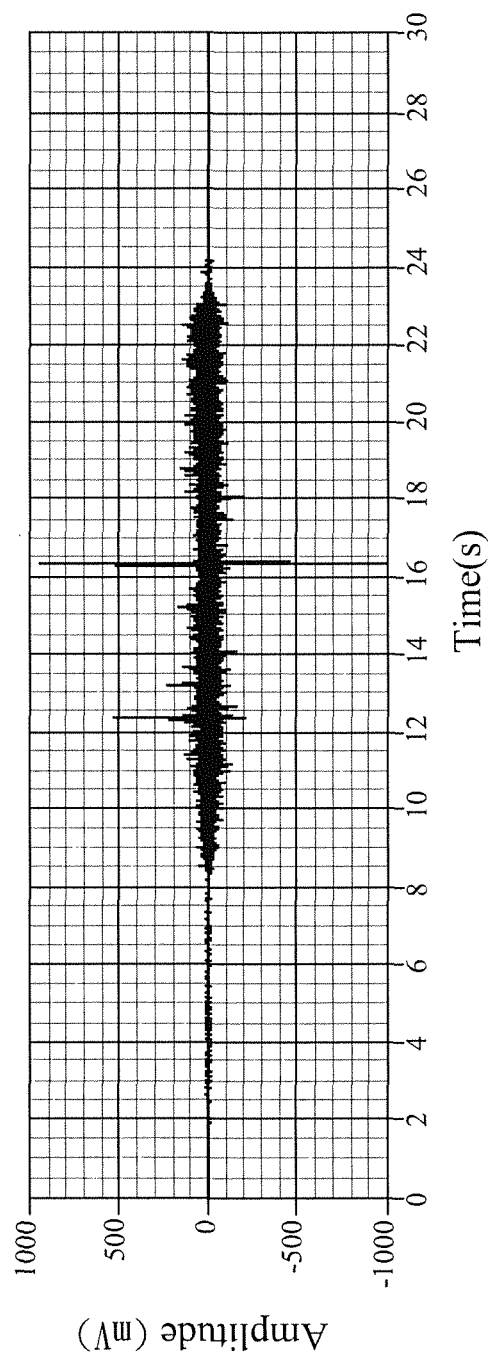
FIG. 5 is a curve of a vibration acceleration signal of a build up edge.

Through the observation of the vibration acceleration signal, the signal has a very large vibration acceleration such as two to three times of that of a normal cutting at the beginning of the occurrence of the build up edge and before the cutter loses most of its cutting capability. In FIG. 5 that shows a curve of a vibration acceleration signal of a build up edge, the cutter loses most of its cutting capability after 18 seconds, and a very large vibration is produced spontaneously within 16 to 17 seconds after the build up edge occurs, and shown in the vibration acceleration. The main factor causing this phenomenon is the sudden change of cutting force.

Figure 6:
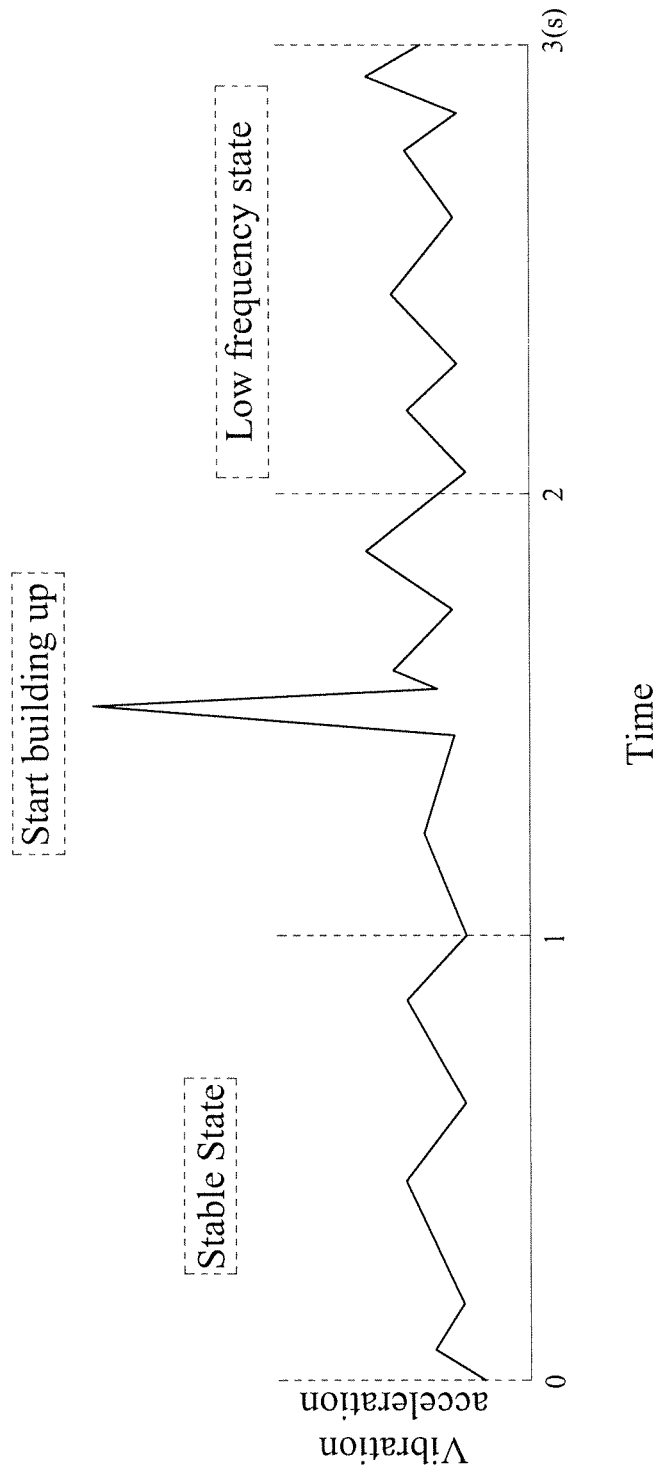
FIG. 6 is a curve of a signal characteristic analysis of a build up edge.

The build up edge has the following two characteristics: (1) The blade passing frequency falls in a neighborhood of (N-A)/N times of the blade passing frequency; and (2) The abnormal vibration acceleration is produced when the build up edge occurs spontaneously. Based on these two characteristics, the following algorithm is used to establish the build up edge diagnosis:

1: Compare and check whether there is a sudden increase of the vibration acceleration:

Based on the characteristic of having an abnormal vibration acceleration when a build up edge occurs, and the result of the abnormal signal of a build up edge collected and analyzed in the research, the build up edge signal has an abnormality period of approximately 3 seconds, and the signal capturing and vibration diagnosis of the overall system use "second" as the unit for capturing the signals, so that the analysis of the build up edge also uses second as the unit for the analysis, and the signals generated in three consecutive seconds are checked to determine whether they match with the characteristic of the build up edge. With reference to FIG. 6 for a curve of a signal characteristic analysis of a build up edge, vibration signals of three consecutive seconds are used as an example, wherein a normal cutting vibration acceleration signal is captured within 0 to 1 second before the abnormality occurs, and chips start accumulated within 1 to 2 seconds, wherein a change of a normal rake angle γn occurs to generate an abnormal vibration signal. Experiment results show that the amplitude of this signal is greater than two times or more of the average amplitude of the previous second (within the period of 0-1 second), and this doubled value is set as an essential threshold value for the algorithm for diagnosing the build up edge. Within the time period from 2 to 3 seconds, the build up edge loses its cutting capability. In this time period, the blade passing frequency is a low frequency. By comparing the maximum value of the acceleration of the current vibration signal and the average value of the acceleration of the vibration signal of the previous second, we can know whether there is an abnormal vibration matched with the build up edge characteristic occurs during the cutting process.

2: Compare the vibration frequency and the blade passing frequency $$\times \frac{(N-A)}{N}:$$

After the build up edge occurs, the relation between the vibration frequency and the blade passing frequency is shown in Equation (1-1), wherein N is the number of cutters and A is the number of build-up edged cutters. In FIG. 6, after the build up edge is produced at the beginning, the build-up edge cutter gradually loses its cutting capability in 2 to 3 seconds, and the current blade passing frequency is a low frequency. As long as the main shaft rotating speed S of a CNC machine tool and the number of cutters N used in the manufacture are known, we can calculate the blade passing frequency, and the Fast Fourier Transform can be used to analyze the cutting vibration signal to determine whether the relation between the vibration frequency and the blade passing frequency matches the condition of Equation (1-1).

3: Filter the signal to a vibration signal with a frequency exceeding 1.1 times of the blade passing frequency:

When the build up edge occurs, the vibration signal is very unstable, so that a high frequency abnormality signal occurred during the monitoring process generally blocks a low frequency signal with the build up edge characteristic, or the vibration frequency of the current build up edge matches the natural frequency of a machine to cause a resonance and result in a misjudgment of the monitoring since the build up edge signal is not significant. Through experimental observation, misjudgments can be avoided by filtering any vibration signal having a frequency exceeding 1.1 times of the blade passing frequency in the process of monitoring the build up edge, so that the monitoring system can achieve a stable and quick build up edge monitoring effect without being interfered by the high-frequency signals.

In summation, the build up edge monitoring method of the present invention sets the following build up edge monitoring algorithm:

(1) Capture an online real-time vibration acceleration signal.
(2) Filter the vibration signal having a frequency exceeding to 1.1 times of a blade passing frequency.
(3) Compare the vibration acceleration to check if there is a sudden increase.
(4) Determine whether a main frequency of the current vibration signal matches a build up edge characteristic frequency by a Fast Fourier Transform.
(5) The system is considered to have a build up edge if the last two conditions are satisfied. A shutdown instruction is issued to the CNC controller to shut down the cutting machine.

In addition, the captured vibration acceleration signal may be a vibration signal other than that captured from a cutting before the cutter is in contact with the workpiece 1. For example, this vibration signal many be generated by a vibration produced by a fast positioning or a vibration produced by stopping the rotation of a main shaft. These vibrations produced factors other than the cutting may cause a misjudgment in a diagnosis, so that the build up edge monitoring method cannot be applied to a complicated cutting process. Since the CNC controller can retrieve information such as a NC code 1121 from a controller, and the NC code 1121 is an NC instruction executed by the CNC controller 112 to determine the current movement of the machine, so as to overcome the aforementioned problems. Table 1 is a list of NC codes.

TABLE 1

NC codes of Monitoring Algorithm

| NC Code | Function |
| --- | --- |
| G00 | Positioning (Fast Feeding) |
| G0 | Positioning (Fast Feeding) |
| G28 | Reset to Origin |

TABLE 1-continued

NC codes of Monitoring Algorithm

| NC Code | Function |
|---|---|
| M00 | Stop program |
| M0 | Stop program |
| M01 | Selectively stop |
| M1 | Selectively stop |
| M02 | Program ends |
| M2 | Program ends |
| M05 | Stop main shaft |
| M5 | Stop main shaft |
| M06 | Change cutter automatically |
| M19 | Position main shaft |
| M30 | Program ends |

The build up edge monitoring method of the present invention is capable of performing online real-time detection and suppression of an abnormal build up edge during a CNC manufacture, and avoiding the use of a complicated signal conversion analysis in the monitoring process, but using adopting a signal variation analysis and a Fast Fourier Transform for the signal analysis instead, so as to improve the efficiency and reliability of the cutting abnormality diagnosis based on a build up edge diagnostic algorithm.

While the invention has been described by means of specific embodiments, numerous modifications and variations could be made thereto by those skilled in the art without departing from the scope and spirit of the invention set forth in the claims.

In summation of the description above, the present invention improves over the prior art and complies with patent application requirements, and thus is duly filed for patent application.

What is claimed is:

1. A build up edge monitoring method, used for monitoring a cutting machine, comprising the steps of:
    capturing a cutting vibration acceleration signal;
    filtering the cutting vibration acceleration signal with a frequency exceeding 1.1 times of a blade passing frequency, and the blade passing frequency being determined by a main shaft rotating speed S and a number of cutters N;
    comparing the cutting vibration acceleration signals of three consecutive predetermined time periods, and analyzing a maximum value and an average value of the cutting vibration acceleration signal of each predetermined time period, wherein the three consecutive predetermined time periods are a first predetermined time period, a second predetermined time period and a third predetermined time period;
    calculating a maximum value of the cutting vibration acceleration signal in the second predetermined time period and an average value of the cutting vibration acceleration signal in the first predetermined time period;
    comparing the maximum value of the cutting vibration acceleration signal in the second predetermined time period with the cutting vibration acceleration signal in the first predetermined time period to check whether a difference thereof is two times;
    performing a fast Fourier transform of the cutting vibration acceleration signal of the third predetermined time period to solve a main vibration frequency of the cutting vibration acceleration signal;
    solving a blade passing frequency of a build up edge, wherein the blade passing frequency of the build up edge is equal to the blade passing frequency $$\times \frac{(N-A)}{N},$$

wherein A is the number of built-up edged cutters, N is the number of cutters; and
    determining whether the main vibration frequency of the cutting vibration acceleration signal matches a blade passing frequency of the build up edge;
    shutting down the cutting machine, when the difference between the maximum values of the cutting vibration acceleration signal in the second predetermined time period and the cutting vibration acceleration signal in the first predetermined time period is two times, and the main vibration frequency matches the blade passing frequency of the build up edge.

2. The build up edge monitoring method of claim 1, wherein the blade passing frequency is determined by:

$$Hz = \frac{S}{60} \times N;$$

wherein, $$\frac{S}{60}$$

is the main shaft rotating frequency, S is the main shaft rotating speed, and N is the number of cutters.

3. The build up edge monitoring method of claim 1, wherein each of the consecutive predetermined time periods is one second.

4. The build up edge monitoring method of claim 1, wherein the cutting vibration acceleration signal is captured by a vibration signal capturing module, and the vibration signal capturing module comprises a vibration accelerometer, a signal amplifier, a signal capturing box and a data acquisition card.

5. The build up edge monitoring method of claim 4, wherein the vibration signal capturing module compares a NC code to determine whether to capture a vibration signal generated by a factor other than cutting.

6. The build up edge monitoring method of claim 5, wherein the NC code is generated by a CNC controller and the CNC controller generates the NC code according to a status of a fast feed orientation of a cutter or a shutdown of the main shaft of the cutter.

* * * * *